(12) United States Patent
Buckley (10) Patent No.: US 11,044,307 B2
(45) Date of Patent: Jun. 22, 2021

(54) CROSS-CUSTOMER WEB APP ANALYTICS

(71) Applicant: CITRIX SYSTEMS, INC., Fort Lauderdale, FL (US)

(72) Inventor: William Buckley, West Roxbury, MA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 58 days.

(21) Appl. No.: 16/297,860

(22) Filed: Mar. 11, 2019

(65) Prior Publication Data

US 2020/0293348 A1 Sep. 17, 2020

(51) Int. Cl.
| | |
|---|---|
| *G06F 9/455* | (2018.01) |
| *H04L 29/08* | (2006.01) |
| *H04L 29/06* | (2006.01) |
| *H04L 12/24* | (2006.01) |

(52) U.S. Cl.
CPC ...... *H04L 67/1008* (2013.01); *G06F 9/45558* (2013.01); *H04L 41/0813* (2013.01); *H04L 41/5067* (2013.01); *H04L 67/141* (2013.01); *H04L 67/143* (2013.01); *H04L 67/22* (2013.01); *H04L 67/38* (2013.01); *G06F 2009/45595* (2013.01); *H04L 41/046* (2013.01); *H04L 67/42* (2013.01)

(58) Field of Classification Search
CPC .. G06F 11/3414; G06F 9/45533; G06F 9/455; G06F 9/45558; G06F 2009/45595; H04L 61/1505; H04L 41/509; H04L 67/1097; H04L 47/822; H04L 67/1008; H04L 67/143; H04L 67/22; H04L 67/38; H04L 67/42; G06Q 30/02
See application file for complete search history.

(56) References Cited

U.S. PATENT DOCUMENTS

| | | | |
|---|---|---|---|
| 8,725,886 B1 * | 5/2014 | Pulier | H04L 47/822 709/229 |
| 9,176,744 B2 | 11/2015 | Lee | |
| 9,538,345 B2 | 1/2017 | Sah et al. | |
| 2011/0022812 A1 * | 1/2011 | van der Linden | .. H04L 67/1097 711/163 |

(Continued)

*Primary Examiner* — Tuan A Vu
(74) *Attorney, Agent, or Firm* — Allen, Dyer, Doppelt + Gilchrist, PA (57) ABSTRACT

A computing system includes virtualization servers running virtual machine sessions, and client computing devices grouped by respective enterprises. Each client computing device is operated by an end-user to access an application via a virtual desktop during one of the virtual machine sessions. An analytics server is coupled to the virtualization servers, and collects application usage parameters provided for each client computing device accessing the application during one of the virtual machine sessions, and analyzes the application usage parameters to determine application performance of the application across the client computing devices for each respective enterprise. Client computing devices having slower application performances as compared to application performances of other client computing devices are identified by the analytics server. One of the virtualization servers is instructed to re-provision the virtual hardware for the client computing devices having slower application performances so that application performances are increased.

16 Claims, 5 Drawing Sheets

(56) References Cited

U.S. PATENT DOCUMENTS

| | | | |
|---|---|---|---|
| 2014/0032761 A1* | 1/2014 | Beveridge | G06F 9/45533 709/226 |
| 2014/0136693 A1* | 5/2014 | Greifeneder | H04L 61/1505 709/224 |
| 2014/0365662 A1* | 12/2014 | Dave | G06Q 30/02 709/226 |
| 2015/0172135 A1* | 6/2015 | Coppola | H04L 41/509 709/203 |
| 2015/0378864 A1* | 12/2015 | Lensmar | G06F 11/3414 717/130 |

* cited by examiner

CROSS-CUSTOMER WEB APP ANALYTICS

TECHNICAL FIELD

The present disclosure relates to desktop virtualization, and more particularly, to analyzing activities performed within an application accessed via virtual desktops across a large population of end-users.

BACKGROUND

Many enterprises are using desktop virtualization to provide a more flexible option to address the varying needs of their end-users. Desktop as a Service (DaaS) is the delivery of virtual desktops offered as a hosted service by a service provider.

In desktop virtualization, a user's computing environment (e.g., operating system, applications, and user settings) may be separated from the user's physical computing device (e.g., smartphone, laptop, desktop computer). Using client-server technology, a virtualized desktop may be stored in and administered by a remote virtualization server, rather than in the local storage of the user's physical computing device. Desktop virtualization may be implemented using a single virtualization server or a combination of servers interconnected as a server grid.

SUMMARY

An analytics server includes a memory configured to collect application usage parameters from a plurality of virtualization servers configured to run virtual machine sessions providing at least one application to one of a plurality of client computing devices grouped by respective enterprises. A processor is coupled to the memory and is configured to analyze the application usage parameters to determine application performance of at least one application across the plurality of client computing devices for each respective enterprise. Client computing devices having slower application performances as compared to application performances of other client computing devices are identified by the processor. At least one of the virtualization servers is instructed by the processor to re-provision virtual hardware associated with the virtual machine session for the client computing devices having slower application performances so that application performances are increased.

Analytical data available in Desktop as a Service (DaaS) environments may be leveraged to perform detailed roll-up information about application usage across a large population of users. The re-provisioning advantageously increases hardware resources for the operating system container running the application.

The application performances of at least one application for the plurality of client computing devices are grouped by enterprises by the processor, and wherein the client computing devices receiving the re-provisioned virtual hardware are within the same enterprise.

The re-provisioned virtual hardware as instructed by the processor comprises a faster processor to increase application performances. The re-provisioned virtual hardware as instructed by the processor comprises a larger size RAM to increase application performances.

Hardware resources of the provisioned virtual hardware varies between enterprises, and wherein the memory is further configured to collect, as provided from each virtualization server, hardware resource information of the provisioned virtual hardware for each virtual machine session. The hardware resource information comprises a processor speed and RAM size.

Each virtual machine session further has a management agent that hooks into the at least one application to provide the application usage parameters.

The application usage parameters provided by the management agent for each virtual machine session include a pre-launch time and a post-launch time of at least one application, and wherein application performance of the at least one application as determined by the processor comprises a launch time based on a difference between the pre-launch and post-launch times.

The application usage parameters provided by the management agent for each virtual machine session include exit codes, and wherein application performance of the at least one application as determined by the processor comprises whether launch of the at least one application was a success or a failure.

The memory and the processor operate in real time to instruct the at least one of the virtualization servers to re-provision the virtual hardware for the client computing devices having slower application performances.

Another aspect is directed to a method for operating an analytics server within a computing system comprising a plurality of virtualization servers configured to run virtual machine sessions providing at least one application to one of a plurality of client computing devices grouped by respective enterprises.

The method includes collecting application usage parameters provided for each client computing device accessing the at least one application during one of the virtual machine sessions, analyzing the application usage parameters to determine application performance of the at least one application across the plurality of client computing devices for each respective enterprise, and identifying client computing devices having slower application performances as compared to application performances of other client computing devices. At least one of the virtualization servers is instructed to re-provision virtual hardware associated with the virtual machine session having slower application performances so that application performances are increased.

Yet another aspect is directed to a non-transitory computer readable medium for operating an analytics server as described above, and with the non-transitory computer readable medium having a plurality of computer executable instructions for causing the analytics server to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be discussed below, a computing system with an analytics server is used for analyzing activities performed within an application accessed via virtual desktops across a large population of end-users grouped at respective enterprises. This allows application performance to be monitored at the respective enterprises. If an enterprise is experiencing slower application performance as compared to other enterprises, then corrective action is taken to re-provision the virtual hardware supporting the virtual desktops. The re-provisioned virtual hardware may include faster processors and increased memory size, for example.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, solid-state storage devices, and/or any combination thereof.

Figure 1:
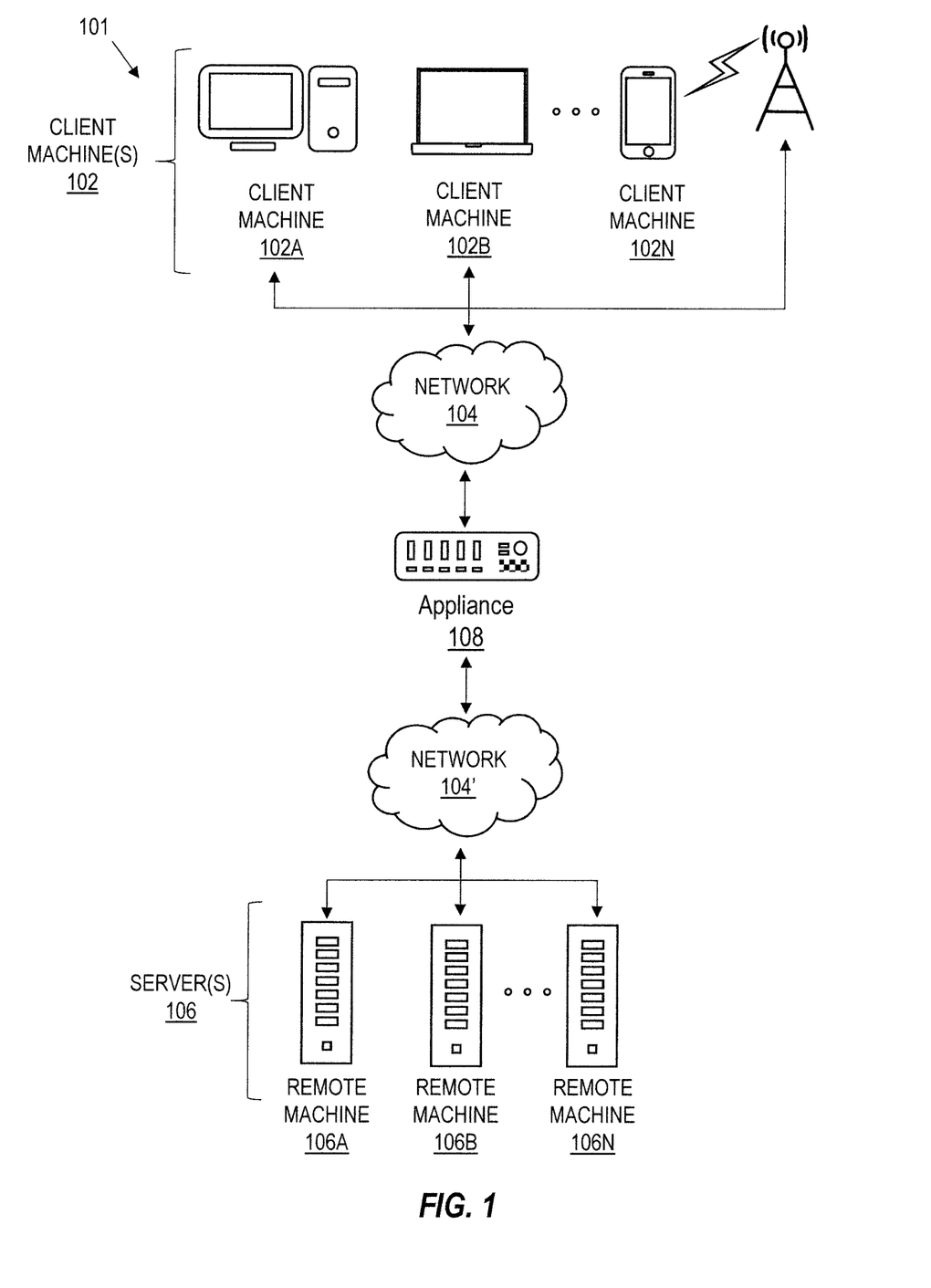
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer or Transport Layer Security Virtual Private Network (SSL/TLS VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
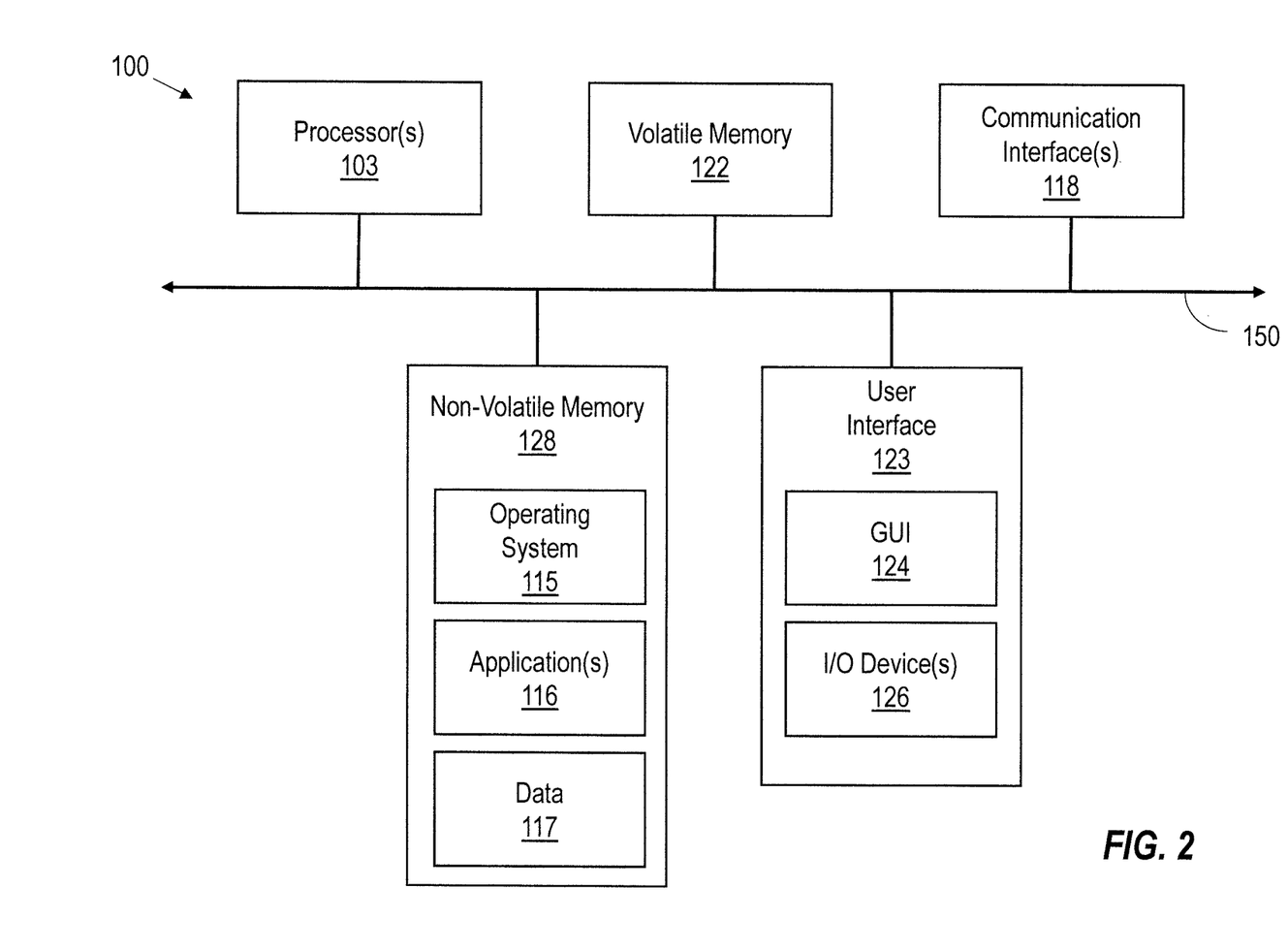
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

As will be discussed below, a computing system with an analytics server is used for analyzing activities performed within an application accessed via virtual desktops across a large population of end-users grouped at respective enterprises. The analytics server collects and analyzes application performance parameters for end-users within each enterprise. If there is a degradation in application performance that is being experienced by the end-users in one of the enterprises as compared to the other enterprises, then corrective action is taken. Corrective action includes re-provisioning the virtual hardware for the virtual desktops so that application performances are in line with the application performances being experienced by the end-users in the other enterprises. As such, the systems and methods set forth herein advantageously provide improved performance within a virtualized and/or enterprise computing environment.

Figure 3:
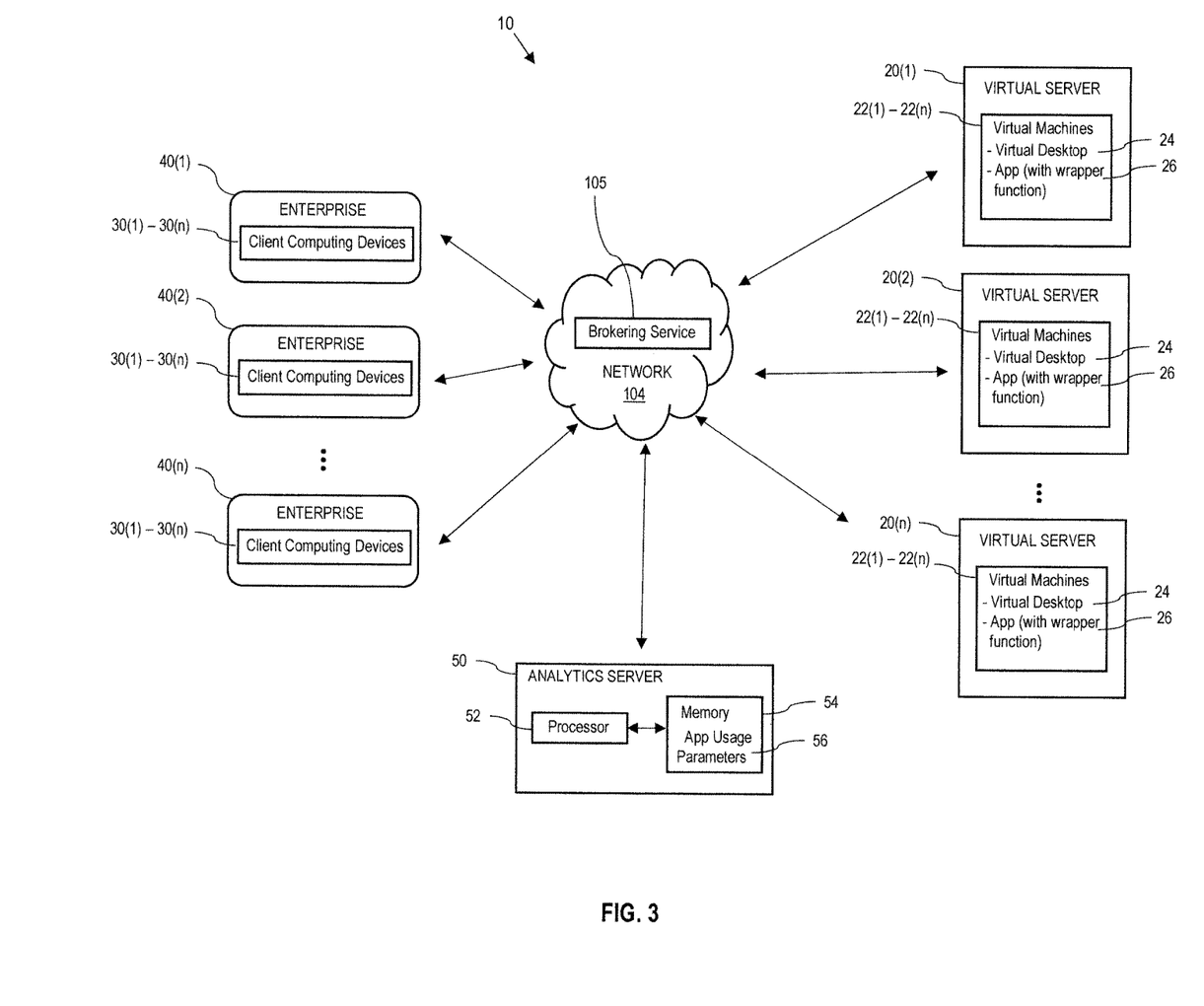
FIG. 3 is a block diagram of a computing system with an analytics server for analyzing activities performed within an application accessed via virtual desktops in which various aspects of the disclosure may be implemented.

Referring initially to FIG. 3, the illustrated computing system 10 includes virtual servers 20(1)-20(n) that run virtual machine sessions 22(1)-22(n), with virtual desktops 24 and at least one application 26 being provided during the virtual machine sessions 22(1)-22(n). Client computing devices 30(1)-30(n) are grouped by respective enterprises 40(1)-40(n). Each client computing device is operated by an end-user to access the application 26 via the virtual desktop 24 during one of the virtual machine sessions. An analytics server 50 is coupled to the virtual servers 20(1)-20(n) and is configured to monitor performance of the application 26 when accessed by the end-users at the respective enterprises 40(1)-40(n).

If the analytics server 50 determines that there is a degradation in application performance that is being experienced by the end-users in one of the enterprises 40(1)-40(n) as compared to the other enterprises, then corrective action is taken. The analytics server 50 may also narrow down the degradation in application performance within this one enterprise to a cluster of end-users. Corrective action includes re-provisioning for this one enterprise the virtual hardware supporting the virtual desktops 24 experiencing a degradation in application performance. The re-provisioned virtual hardware may include faster processor speed and larger sized RAM memory, for example.

The client computing devices 30(1)-30(n) and the enterprises 40(1)-40(n) are generally referred to as client computing devices 30 and enterprises 40. The number of client computing devices 30 within each enterprise 40 may vary from several hundred to several thousand, for example. Likewise, the number of enterprises 40 may vary from several hundred to several thousand, for example.

The virtual servers 20(1)-20(n) are generally referred to as virtual servers 20, and the virtual machine sessions 22(1)-22(n) that run on the virtual servers 20 are generally referred to as virtual machine sessions 22. The number of virtual servers 20 as well as the number of virtual machine sessions 22 may also vary from several hundred to several thousand, for example.

The illustrated network 104 includes a provisioning service that interfaces with the virtual servers 20. The provisioning service provisions the virtual hardware for the virtual machines 22 within the virtual servers 20. As an example, enterprise 40(1) has 100 end-users. The provisioning service determines how many virtual servers 20 are needed for the enterprise 40(1), and then provisions the virtual hardware within the virtual servers 20 to support the enterprise 40(1).

The provisioned virtual hardware for each enterprise 40 has resource parameters associated therewith. The resource parameters for the provisioned virtual hardware for enterprise 40(1), for example, include a 2.7 GHz processor and an 8 GB RAM. The provisioned or allocated virtual hardware is generally the same for each client computing device 30 within the enterprise 40(1).

However, the resource parameters of the provisioned virtual hardware generally varies between the enterprises 40. For example, the provisioned virtual hardware for enterprises 40(2)-40(n) may have faster processors (3.3 GHz or 3.7 GHz, for example) and larger sized RAM (16 GB or 32 GB, for example). This variation may be based on cost to the respective enterprises 40.

A virtual desktop 24 and one or more applications 26 are provided to each of the client computing devices 30 during a virtual machine session 22. The applications 26 provided with the virtual desktop may be Word and Excel, for example. Analytical data is collected by the analytics server 50 on usage of these applications 26 across a large population of end-users. The end-users are grouped by respective enterprises 40, where each enterprise 40 is a different customer to the service provider providing the virtual servers 20. This advantageously allows application performance to be compared between the different enterprises 40, and for corrective action to be taken to improve application performance within an enterprise 40 when needed.

With desktop as a service (DaaS) being provided to a large number of enterprises 40, this offers the ability to aggregate data from a large heterogenous user population. Given the long-tail like nature of business applications, there will be a large overlap in the applications 26 used within each enterprise 40. This data is collected and analyzed by the analytics server 50 so that configuration of the different desktop environments may be changed to optimize end-user experience with the applications 26.

To track performance of an application 26, a management agent is present on each virtual machine session 22. The management agent may be a wrapper function, for example. The management agent is used to collect data on each respective virtual machine session 22 and provide this data to the analytics server 50 which is then used to determine how the application 26 performs for the end-users of the client computing devices 20 accessing the application 26.

The wrapper function launches the application 26 for each virtual machine session 22, and includes hooks into the application 26 to track various application usage parameters 56. The application usage parameters collected by the hooks are provided to the analytics server 50. The analytics server 50 includes a memory 54 to store the application usage parameters 56 for each client computing device 30 within each enterprise 40.

As an example, the management agent provides hooks to determine a pre-launch time and a post-launch time of the application 26. This allows the analytics server 50 to determine a launch time of the application 26 by subtracting the pre-launch time from the post-launch time. The launch time for each client computing device 30 within each enterprise 40 are tracked by the analytics server 50. The analytics server 60 correlates each launch time to the respective client computing device 30 accessing the application 26.

As another example, the management agent provides hooks to exit codes within the application 26. This allows the analytics server 60 to determine if launch of the application 26 was a success or a failure. The exit codes for each client computing device 30 within each enterprise 40 are tracked by the analytics server 60. The analytics server 50 also correlates each launch success or failure to the respective client computing device 30 accessing the application 26.

The hooks as discussed above are not to be limiting. As readily appreciated by those skilled in the art, the management agent may provide other hooks to collect other types of data as related to usage/performance of the application 26. Based on the hooks, the analytics server 50 collects and stores the application usage parameters 56 for each client computing device 30 accessing the application 26 during one of the virtual machine sessions 22.

The analytics server 50 includes a processor 52 that analyzes the application usage parameters 56 stored in the memory 54 to detect usage patterns of the application 26 across the client computing devices 30 for each respective enterprise 40. Performance degradation issues are determined by the processor 52 for client computing devices 30 deviating negatively from the detected usage patterns when accessing the application 26.

The analytics server 50 determines how application performance for each enterprise 40 falls within a statistical envelope that includes all other end-users of the application 26. As an example, the analytics server 50 determines that the application launch times for the client computing devices 30 in enterprise 40(1) are slower as compared to the application launch times for the client computing devices 30 in the other enterprises 40(2)-40(n).

The analytics server 60 also determines corrective action so that the launch time of the application 26 within enterprise 40(1) is shortened so that it falls in line with the launch times of the application 26 in the other enterprises 40(2)-40(n). In the illustrated embodiment, the correction action is initiated by the analytics server 60. In other embodiments, the corrective action may be initiated by a different server, such as a corrective action sever that communicates with the analytics server 60.

The analytics server 60 instructs at least one of the virtual servers 20 via the provisioning service within the network 104 to re-provision the virtual hardware for the client computing devices 30 having slower application performances so that application performances are increased. In the illustrated example, the virtual hardware for the client computing devices 30 in enterprise 40(1) are re-provisioned to have a faster processor (e.g., 3.3 GHz) and a larger size RAM (e.g., 16 GB).

In addition to the analytics server 50 communicating with the provisioning service, the analytics server 50 may communicate with a brokering service 105 within the network 104. The brokering service 105 validates ID of the end-users, as well as providing connection to a specific virtual machine 22.

In the above example of the application performance being slower for the client computing devices 30 in enterprise 40(1), this may be because connection with the virtual servers 20 is not geographically optimized. Corrective action by the analytics server 50 is to instruct the brokering service 105 to select different virtual servers that are geographically closer to location of enterprise 40(1). In other cases, corrective action to increase application performance is to switch to a faster network pipe for the enterprise 40(1).

Figure 4:
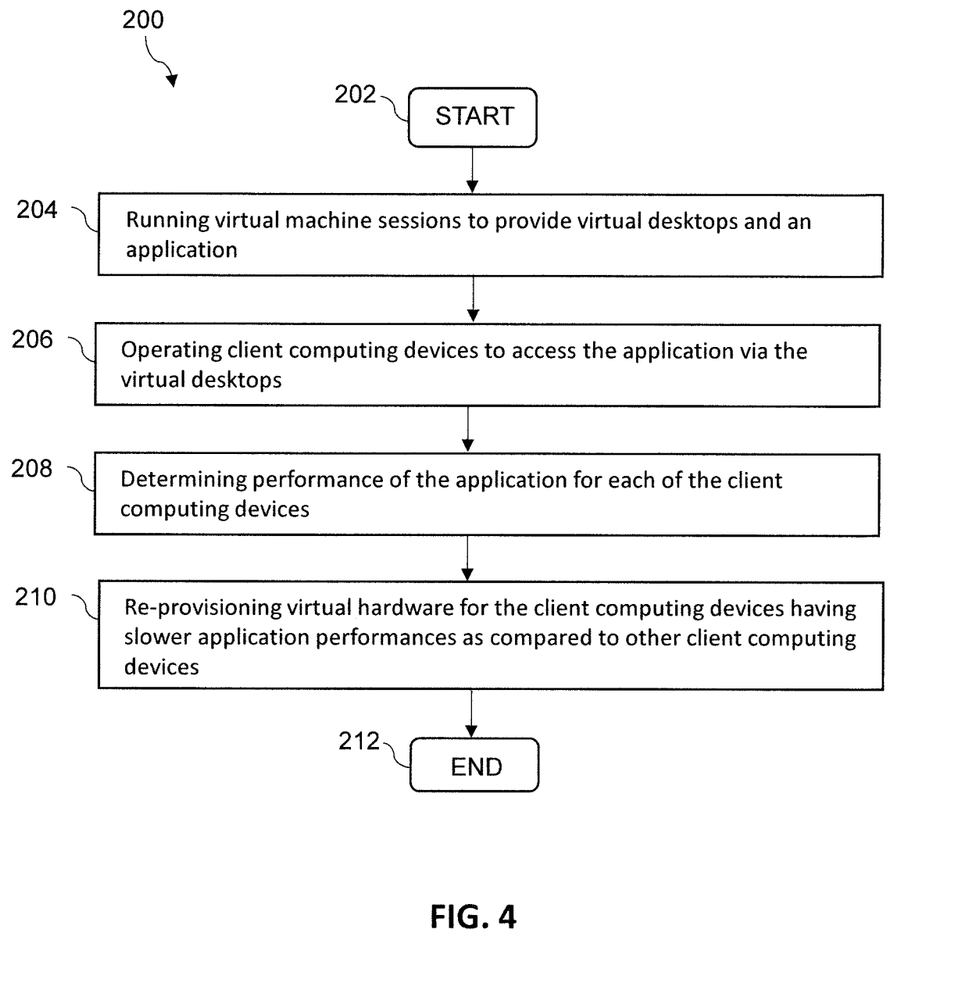
FIG. 4 is a general flowchart illustrating a method for operating the computing system illustrated in FIG. 3.

Referring now to the flowchart 200 in FIG. 4, and generally speaking, a method for operating the computing system 10 will be discussed. From the start (Block 202), the method includes running virtual machine sessions 22 to provide virtual desktops 24 and an application 26 at Block 204. Client computing devices 30 are operated at Block 206 to access the application 26 via the virtual desktops 24. Performance of the application 26 is determined at Block 208 for each of the client computing devices 30. This performance is tied to the entire session that the application is being launched in. Application performance thus includes consideration of the performance of the virtual machine 22, performance of the network 104, performance of the user's log in session into the operating system of the virtual machine 22, as well as performance of the client computing device 30 being used by the end-user. Virtual hardware for the client computing devices 30 having slower application performances as compared to other client computing device 30 are re-provisioned at Block 210. The method ends at Block 212.

Figure 5:
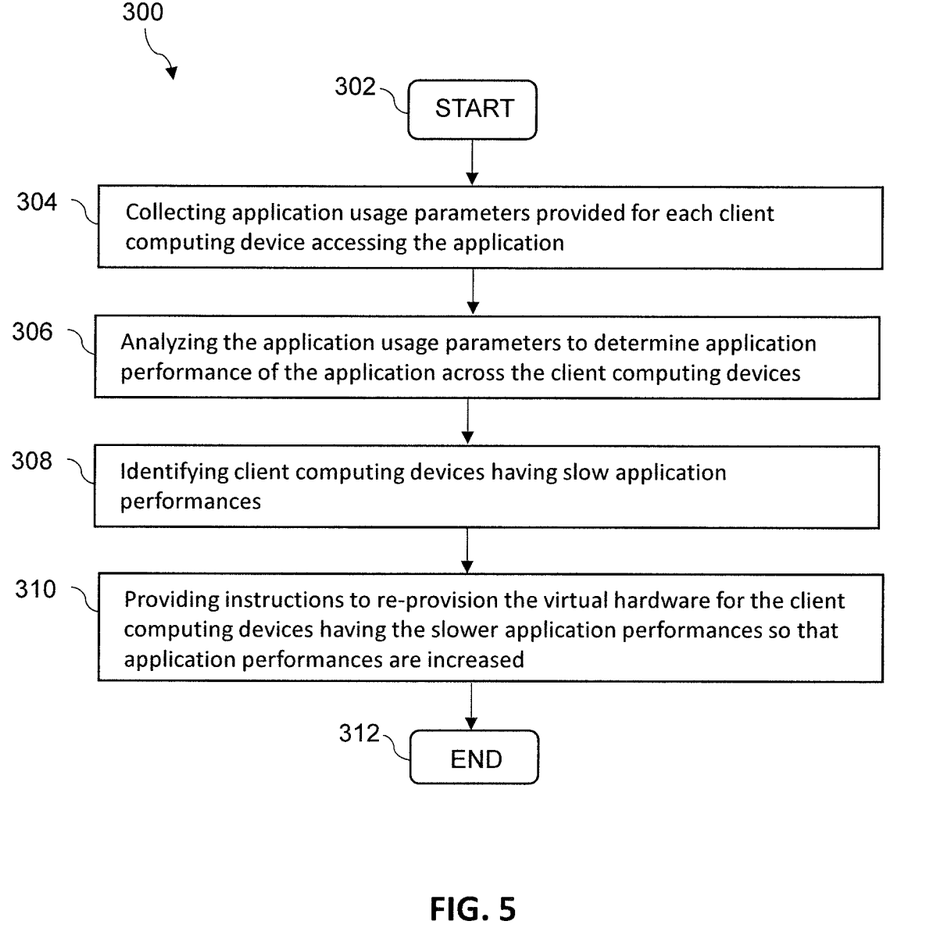
FIG. 5 is a general flowchart illustrating a method for operating the analytics server illustrated in FIG. 3.

Referring now to the flowchart 300 in FIG. 5, a method for operating the analytics server 50 will be discussed. From the start (Block 302), the method includes collecting application usage parameters 56 at Block 304 provided for each client computing device 30 accessing the application 26. The application usage parameters 56 are analyzed at Block 306 to determine application performance of the application 26 across the client computing devices 30 for each respective enterprise 40. The method further includes identifying client computing devices 30 having slow application performances at Block 308 as compared to application performances of other client computing devices 30. Instructions are provided at Block 310 to re-provision the virtual hardware for the client computing devices 30 having the slow application performances so that application performances are increased. The method ends at Block 312.

Another aspect is directed to a non-transitory computer readable medium for operating an analytics server 50 within a computing system 10 comprising a plurality of virtualization servers 20 and a plurality of client computing devices 30. The virtualization servers 20 are configured to run virtual machine sessions 22, with virtual desktops 24 and at least one application 26 being provided during the virtual machine sessions 22, and with each virtual machine session 22 having provisioned virtual hardware and a management agent that hooks into the at least one application 26 to provide application usage parameters. The client computing devices 30 are grouped by respective enterprises 40, with each client computing device 30 being operated by an end-user to access the at least one application 26 via the virtual desktop 24 during one of the virtual machine sessions 22.

The non-transitory computer readable medium has a plurality of computer executable instructions for causing the analytics server 50 to collect the application usage parameters 56 provided for each client computing device 30 accessing the at least one application 26 during one of the virtual machine sessions 22. The application usage parameters 56 are analyzed to determine application performance of the at least one application 26 across the plurality of client computing devices 30 for each respective enterprise 40.

The analytics server 50 identifies client computing devices 30 having slower application performances as compared to application performances of other client computing devices 30. At least one of the virtualization servers 30 is instructed to re-provision the virtual hardware for the client computing devices 30 having slower application performances so that application performances are increased.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. An analytics server comprising:
   a memory configured to collect application usage parameters from a plurality of virtualization servers configured to run virtual machine sessions providing at least one application to a plurality of client computing devices grouped by respective enterprises, with each virtual machine session having a management agent that hooks into the at least one application to provide the application usage parameters, with the application usage parameters including exit codes to determine whether launch of the at least one application was a success or a failure; and
   a processor coupled to said memory and configured to perform the following:
      analyze the application usage parameters to determine application performance of the at least one application by end-users across the grouped client computing devices for each respective enterprise, with the client computing devices in each respective enterprise falling within a statistical envelope that includes all other end-users of the at least one application,
      identify in one of the enterprises the grouped client computing devices having slower application performances as only compared to application performances in the enterprises of the other grouped client computing devices, and
      instruct at least one of the virtualization servers to re-provision virtual hardware associated with the virtual machine session for the grouped client computing devices in the one enterprise having slower application performances so that application performances are increased.

2. The analytics server according to claim 1 wherein application performances of the at least one application for the plurality of client computing devices are grouped by enterprises by said processor, and wherein the client computing devices receiving the re-provisioned virtual hardware are within the same enterprise.

3. The analytics server according to claim 1 wherein the re-provisioned virtual hardware as instructed by said processor comprises a faster processor to increase application performances.

4. The analytics server according to claim 1 wherein the re-provisioned virtual hardware as instructed by said processor comprises a larger size RAM to increase application performances.

5. The analytics server according to claim 1 wherein hardware resources of the provisioned virtual hardware varies between enterprises, and wherein said memory is further configured to collect, as provided from each virtualization server, hardware resource information of the provisioned virtual hardware for each virtual machine session.

6. The analytics server according to claim 5 wherein the hardware resource information comprises a processor speed and RAM size.

7. The analytics server according to claim 1 wherein the application usage parameters provided by the management agent for each virtual machine session include a pre-launch time and a post-launch time of the at least one application, and wherein application performance of the at least one application as determined by said processor comprises a launch time based on a difference between the pre-launch and post-launch times.

8. The analytics server according to claim 1 wherein said memory and said processor operate in real time to instruct the at least one of the virtualization servers to re-provision the virtual hardware for the client computing devices having slower application performances.

9. A method for operating an analytics server within a computing system comprising a plurality of virtualization servers configured to run virtual machine sessions providing at least one application to a plurality of client computing devices grouped by respective enterprises, with each virtual machine session having a management agent that hooks into the at least one application to provide the application usage parameters, with the application usage parameters including exit codes to determine whether launch of the at least one application was a success or a failure, the method comprising:
  collecting application usage parameters provided for each client computing device accessing the at least one application during one of the virtual machine sessions;
  analyzing the application usage parameters to determine application performance of the at least one application by end-users across the grouped client computing devices for each respective enterprise, with the client computing devices in each respective enterprise falling within a statistical envelope that includes all other end-users of the at least one application,
  identifying in one of the enterprises the grouped client computing devices having slower application performances as only compared to application performances in the enterprises of the other grouped client computing devices, and
  instructing at least one of the virtualization servers to re-provision virtual hardware associated with the virtual machine session for the grouped client computing devices in the one enterprise having slower application performances so that application performances are increased.

10. The method according to claim 9 wherein application performances of the at least one application for the plurality of client computing devices are grouped by enterprises, and wherein the client computing devices receiving the re-provisioned virtual hardware are within the same enterprise.

11. The method according to claim 9 wherein the re-provisioned virtual hardware comprises a faster processor to increase application performances.

12. The method according to claim 9 wherein the re-provisioned virtual hardware comprises a larger size RAM to increase application performances.

13. The method according to claim 9 wherein the analytics server receives, from each virtualization server, hardware resource information of the provisioned virtual hardware for each virtual machine session, with the hardware resource information comprising a processor speed and RAM size.

14. The method according to claim 11 wherein the application usage parameters provided by the management agent for each virtual machine session include a pre-launch time and a post-launch time of the at least one application, and wherein application performance of the at least one application comprises a launch time based on a difference between the pre-launch and post-launch times.

15. A non-transitory computer readable medium for operating an analytics server within a computing system comprising a plurality of virtualization servers configured to run virtual machine sessions and providing at least one application to a plurality of client computing devices grouped by respective enterprises, with each virtual machine session having a management agent that hooks into the at least one application to provide the application usage parameters, with the application usage parameters including exit codes to determine whether launch of the at least one application was a success or a failure, and with the non-transitory computer readable medium having a plurality of computer executable instructions for causing the analytics server to perform steps comprising:
  collecting application usage parameters provided for each client computing device accessing the at least one application during one of the virtual machine sessions;
  analyzing the application usage parameters to determine application performance of the at least one application by end-users across the grouped client computing devices for each respective enterprise, with the client computing devices in each respective enterprise falling within a statistical envelope that includes all other end-users of the at least one application,
  identifying in one of the enterprises the grouped client computing devices having slower application performances as only compared to application performances in the enterprises of the other grouped client computing devices, and
  instructing at least one of the virtualization servers to re-provision virtual hardware associated with the virtual machine session for the grouped client computing devices in the one enterprise having slower application performances so that application performances are increased.

16. The non-transitory computer readable medium according to claim 15 wherein the re-provisioned virtual hardware comprises at least one of a faster processor and a larger size RAM to increase application performances.

* * * * *